United States Patent
Brown et al.

(10) Patent No.: US 8,969,446 B2
(45) Date of Patent: Mar. 3, 2015

(54) FLAME RETARDANT POLYURETHANE COMPOSITION

(75) Inventors: Geoffrey D. Brown, Bridgewater, NJ (US); Given Jing Chen, Shanghai (CN); Kawai Peter Pang, Belle Meade, NJ (US); Robert F. Eaton, Belle Mead, NJ (US); Manish Mundra, Somerset, NJ (US); Anteneh Z. Worku, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 676 days.

(21) Appl. No.: 13/056,291

(22) PCT Filed: Jul. 30, 2008

(86) PCT No.: PCT/CN2008/071826
§ 371 (c)(1), (2), (4) Date: Jan. 27, 2011

(87) PCT Pub. No.: WO2010/012136
PCT Pub. Date: Feb. 4, 2010

(65) Prior Publication Data
US 2011/0130490 A1    Jun. 2, 2011

(51) Int. Cl.
*C08K 5/51* (2006.01)
*C08L 75/04* (2006.01)
*C08K 3/32* (2006.01)
*C08K 5/49* (2006.01)
*C08K 5/523* (2006.01)
*C08L 29/04* (2006.01)

(52) U.S. Cl.
CPC . *C08L 75/04* (2013.01); *C08K 3/32* (2013.01); *C08K 5/49* (2013.01); *C08K 5/523* (2013.01); *C08L 29/04* (2013.01)
USPC ............. 524/115; 524/100; 524/80; 524/148; 524/416; 524/135

(58) Field of Classification Search
CPC ....................................................... C08L 75/04
USPC ............................................................ 524/115
See application file for complete search history.

(56) References Cited

U.S. PATENT DOCUMENTS

| | | | | |
|---|---|---|---|---|
| 4,410,595 | A * | 10/1983 | Matsumoto et al. | 428/412 |
| 4,542,170 | A * | 9/1985 | Hall et al. | 523/179 |
| 4,883,837 | A * | 11/1989 | Zabrocki | 525/66 |
| 5,215,809 | A * | 6/1993 | Hoso et al. | 428/195.1 |
| 5,837,760 | A | 11/1998 | Hackl et al. | |
| 2004/0143045 | A1* | 7/2004 | Morgan et al. | 524/115 |
| 2005/0288402 | A1* | 12/2005 | Kosaka et al. | 524/90 |
| 2006/0025513 | A1* | 2/2006 | Nakagawa et al. | 524/494 |
| 2006/0151758 | A1 | 7/2006 | Reyes | |
| 2007/0221890 | A1 | 9/2007 | Gan | |
| 2008/0132615 | A1 | 6/2008 | Peerlings et al. | |
| 2008/0167408 | A1 | 7/2008 | Siddhamalli et al. | |

FOREIGN PATENT DOCUMENTS

| | | |
|---|---|---|
| CN | 101108914 A | 1/2008 |
| CN | 101225224 A | 7/2008 |
| DE | 4026893 A1 | 2/1992 |
| EP | 1719800 A1 | 11/2006 |
| WO | WO-2004044049 A2 | 5/2004 |
| WO | WO 2006 005716 * | 1/2006 |
| WO | WO-2006121549 A1 | 11/2006 |
| WO | WO-2007031450 A1 | 3/2007 |

OTHER PUBLICATIONS

PCT/CN2008/071826, International Preliminary Report on Patentability.
PCT/CN2008/071826, Written Opinion of the International Searching Authority.

* cited by examiner

*Primary Examiner* — Doris Lee

(57) ABSTRACT

The present invention is a flame-retardant polyurethane composition comprising (a) a thermoplastic polyurethane-based resin component, (b) a phosphorus flame retardant particulate filler, and (c) a low melting temperature phosphorus flame retardant agent.

18 Claims, No Drawings

FLAME RETARDANT POLYURETHANE COMPOSITION

There is a need for a polyurethane-based composition and articles made therefrom, where the composition provides an excellent balance of burn performance, physical properties (including excellent heat deformation and flexibility), and extrusion performance. It is desirable composition yield an article having excellent surface smoothness, surface mar resistance, and boosted flexibility (reduced modulus) while maintaining the needed high flame retardant performance and very good tensile strength and toughness properties.

It is believed that the composition and its related articles would be particularly useful for wire-and-cable applications. More particularly, it is believed that the utility will be found in flexible wiring for consumer electronics such as cell phone charger wire, computer data cords, power cords, and accessory cords. Notably, it is desirable to provide a melt-processable composition for preparing a thin wire that passes VW-1 Small-Scale Vertical Burn Test (Underwriters Laboratory Standard 1581, Section 1080). It would be readily apparent that the invented composition would be useful in other applications where flexibility and/or burn resistance are desired.

The present invention is a flame-retardant polyurethane composition comprising (a) a thermoplastic polyurethane-based resin component, (b) a phosphorus flame retardant particulate filler, and (c) a low melting temperature phosphorus flame retardant agent. The composition may further comprise additional polymer components, antioxidants, thermal stabilizers, hydrolytic stability enhancers, acid scavengers, colorants, UV stabilizers, processing aids, other flame retardant components, and synergist additives. It is believed that polar polymer components such as ethylene vinyl acetate (EVA) or other polar copolymers would be particularly useful in achieving further improvements in physical property and extrusion performance balance.

Preferably, a thermoplastic polyurethane is present as a continuous resin phase in an amount greater than or equal to about 30 weight percent of the total thermoplastic polyurethane-based resin component. More preferably, the thermoplastic polyurethane is present in an amount greater than or equal to about 50 weight percent of the total thermoplastic polyurethane-based resin component; most preferably, it is present in an amount greater than or equal to about 70 weight percent of the total thermoplastic polyurethane-based resin component.

The balance of the resin component can be other polymers such as a polyolefin. The additional resins may be present as a dispersed phase within the TPU matrix or as a co-continuous phase interspersed with the TPU phase. It is believed that the selection of other polymers could be based on further improving flame retardancy, fabrication performance such as extrusion torque and pressures, surface smoothness, and melt fracture. Other benefit can include reduction of formulation costs and improved mechanical properties such as toughness, abrasion resistance, and cold impact.

Examples of suitable TPU resins include adipate-type TPUs, polyester TPUs, polyether TPUs, and polycarbonate TPUs. Desired composition performance will determine the selection of the TPU. For example, it is believed that polyester- or polycarbonate-type TPUs will yield improved thermal or ultraviolet color stability over polyether TPUs. Additionally, it is believed that polyether- or polycarbonate-type TPUs will provide better hydrolytic stability than polyester TPUs.

Examples of suitable phosphorus flame retardant particulate fillers include dimer and oligomeric phosphorus compounds such as piperazine polyphosphate, ammonium polyphosphate, ethylene diamine phosphate, and other phosphorus-nitrogen-based flame retardants such as melamine derivatives.

The low melting temperature phosphorus flame retardant agent can be a liquid or a solid at room temperature. When the low melting temperature phosphorus agent is a solid at room temperature, it has a melting temperature less than about 170 degrees Celsius. A particularly useful example of a low melting temperature phosphorus flame retardant agent is bisphenol A polyphosphate liquid (also known as BAPP or BDP). Other useful low melting temperature phosphorus flame retardant agents include phosphate esters such as resorcinol bis(diphenylphosphate), resorcinol dixylenyl phosphate (both oligomeric and monomeric versions), trixylenyl phosphate, triethyl phosphate, and triphenyl phosphate.

Preferably, the low melting temperature phosphorus flame retardant agent is present in an amount greater than or equal to about 5 weight percent of the combined weight of the phosphorus flame retardant particulate fillers and the low melting temperature phosphorus flame retardant agent. More preferably, the low melting temperature component is present in amount greater than or equal to about 10 weight percent of the combined weight; and most preferably, in an amount greater than or equal to about 20 weight percent of the combined weight.

Preferably, the combined weight of the phosphorus flame retardant particulate fillers and the low melting temperature phosphorus flame retardant agent is greater than or equal to about 25 weight percent of the composition.

EXAMPLES

The following non-limiting examples illustrate the invention.

The following raw materials were used to illustrate the invention:

(1) PELLETHANE™ 2355-75A adipate type thermoplastic polyurethane, having a Shore A hardness of 83A and a 28 melt flow measured at 190 degrees Celsius and 8700 grams, and available from The Dow Chemical Company;

(2) ELVAX™ 40L-03 ethylene vinyl acetate copolymer, having a vinyl acetate content of 40 weight percent and a melt index of 3.0, and available from Du Pont de Nemours & Co.;

(3) FP-2100J proprietary phosphorus-nitrogen particulate filler available from Adeka Corporation;

(4) REOFOS BAPP™ phosphoric trichloride reaction product with bisphenol A and phenol; (bisphenol A diphosphate containing less than about 5 percent triphenyl phosphate) and available from Chemtura Corporation;

(5) R350 titanium dioxide being pigment grade and available from Du Pont de Nemours & Co.;

(6) IRGANOX™ 1010 hindered phenolic antioxidant available from Ciba Corporation;

(7) IRGAFOS™ 168 phosphate-based antioxidant available from Ciba Corporation;

(8) CR-733S™ phosphoric trichloride, polymer with 1,3 benzenediol, phenyl ester from Daihachi Chemical Industry Company, Ltd;

(9) trixylenyl phosphate from Daihachi Chemical Industry Company, Ltd;

(10) triethyl phosphate available from Daihachi Chemical Industry Company, Ltd;

(11) FP-600, which is a composition comprising 85-90 weight percent of 4,4'-(isopropylidenediphenyl) bis (diphenyl phosphate), 4-15 weight percent of oligimers of bisphenol A phenyl phosphate, and 1-5 weight percent triphenyl phosphate, and available from Adeka Corporation;

(12) FYROFLEX BDP™ phosphoric trichloride reaction product with bisphenol A and phenol, (bisphenol A diphosphate containing less than about 5 percent triphenyl phosphate) available from Supresta, a Division of ICL Industrial Products Corporation; and

(13) REOFOS RDP™ resorcinol bis(diphenylphosphate); (phosphoric trichloride, polymer with 1,3-benzenediol, phenyl ester) available from Chemtura Corporation.

Sample Preparation

A laboratory Brabender (lobed batch type) mixer was used to prepare compositions for evaluation of extrusion characteristics and key properties. The following steps were used:

(1) The laboratory batch mixer heater settings were at 190 deg C. and mixer was preheated to this temperature.

(2) At 10 RPM mixer rotor speed, the TPU and EVA resin were added along with a portion of the particulate filler, to provide good fill of the mixing bowl. As the materials were heated, fluxing of the resins results in ongoing incorporation of the particulate filler into the melt; additional particulate filler was gradually spooned into the mixer to maintain mixer fill until all of the particulate filler was incorporated into the melt. Then the antioxidant additives were added. The bisphenol A polyphosphate liquid was then added in about 5 equal increments by a syringe, allowing sufficient time for the liquid to be incorporated into the melt before adding more.

(3) After all raw materials were incorporated into the melt, the mixer rotor speed was increased to 40 RPMs and the batch was mixed for until the melt thermocouple in the mixing bowl showed a temperature of 190 degrees Celsius.

(4) To facilitate removal of the melt batch, the mixer temperature was reset to 125 degrees Celsius and the mixer rotor rate was reduced to 5 RPMs. The batch solidified as it cooled, and the mixer rotors ground the solidified composition to a course granulate. The batch was then removed by the typical disassemble and removal of the mixer body.

(5) The material was run through a granulator to provide a fine granulate and homogenized by dry blending. This granulate was then dried overnight at 80 degrees Celsius in a high vacuum oven (<1.0 inch Hg).

(6) A compression molded plaque was prepared at a 190 degrees Celsius molding temperature using a low pressure cycle to facilitate melting, and then a high pressure cycle to shape the 3×200×200 mm plaque (0.075"×8.0"×8.0"). The mold was held at high pressure and cooled to solidify this plaque. ASTM D-638 Type IV tensile testing bars were then punched from this plaque using a dog-bone cutter in an arbor press.

A laboratory Brabender extruder with a wire crosshead was used to fabricate samples of insulated 18AWG stranded wire. A ramped barrel temperature, 170/175/180/180 degrees Celsius, was used with a polyethylene metering screw to prepare a 0.085" finish diameter over a nominal 0.047" conductor diameter. Extruder speed (about 20 RPMs) was tuned to maintain a 4.6 m/minute wiring coating speed at the target geometry, with extruder drive amps and head pressures measured at the constant output condition for extrusion comparison of the various compositions.

Test Procedures

Secant modulus and tensile properties were measured on dogbone specimens using an Instron tensile tester with ASTM D638 as the reference document. For secant modulus, a 58 mm (2.25") initial jaw separation and a 50 mm/minute (2.0 ipm) testing speed were used to provide about 100%/minute specimen strain rate. The 1% secant modulus data was determined using a crosshead displacement method at 1% strain (0.01 minute=0.6 second deflection). Tensile elongation and peak tensile were measured by increasing crosshead speed (@12 seconds) to 500 mm/minute (20 ipm). The percent elongation was measured using an extensometer with a 25 mm initial gauge length to measure strain to break. The tensile properties were calculated via standard calculation using load and specimen cross-sectional area.

Heat deformation of the insulated wire specimen was measured using the ASTM D4565 procedure at a condition of 300 grams load/150 degrees Celsius. Burn performance was tested using the UL-1581 VW-1 test on specimens of the insulated wire. The target burn is a passing UL-1581 VW-1 burn (industry standard wire burn test) at a 0.085" finish diameter over 18AWG stranded copper wire (0.045" conductor diameter). Uncharred length is the average length to undamaged wire measuring down from the test specimen "flag" to the first physical damage, with a value >60 mm indicative of good burn performance.

TABLE I

| Component (Percent by Weight) | Comp. Ex. 1 | Example 2 |
|---|---|---|
| TPU | 43.95 | 42.25 |
| ethylene vinyl acetate copolymer | 7.76 | 7.46 |
| Phosphorus-nitrogen particulate filler | 46.00 | 38.00 |
| REOFOS BAPP bisphenol A polyphosphate | | 10.00 |
| titanium dioxide | 2.00 | 2.00 |
| hindered phenolic antioxidant | 0.20 | 0.20 |
| phosphate-based antioxidant | 0.10 | 0.10 |
| Property | | |
| Tensile Strength @ Peak; MPa (psi) | 13.0 (1890) | 15.5 (2250) |
| Elongation @ Break; % | 484 | 555 |
| 1% Secant Modulus; MPa (psi) | 66.6 (9653) | 28.3 (4099) |
| Lab Wire Extrusion | | |
| Breaker Pressure (psi) | 5050 | 2800 |
| Motor Load; amperes | 4.0 | 2.5 |
| VW-1 | | |
| Burn Flag (pass/total) | 6/6 | 4/6 |
| Uncharred Length (mm to flag) | 59.2 | 36.7 |
| Wire Deformation | | |
| 300 g@150 degrees Celsius; percent | 30.2 | 52.4 |

Example 2 showed dramatic improvement in extrusion performance (much reduced head pressure and amps at same output rate) and flexibility over Comparative Example 1. While tensile strength and elongation were good for Comparative Example 1 and Example 2, Example 2 showed some improvement. Also, notably, Example 2 showed significant improvement in surface smoothness for the insulation profile extrusion, greatly reduced tendency for melt fracture at the high die shear rates typical of commercial insulation fabrication, and substantially reduced strain whitening and scratch whitening for black pigmented compositions.

TABLE II

| Component (Percent by Weight) | Ex. 3 | Ex. 4 | Ex. 5 | Ex. 6 | Ex. 7 | Ex. 8 | Ex. 9 |
|---|---|---|---|---|---|---|---|
| TPU | 42.03 | 42.03 | 42.03 | 42.03 | 42.03 | 42.03 | 42.03 |
| EVA | 4.67 | 4.67 | 4.67 | 4.67 | 4.67 | 4.67 | 4.67 |
| Phosphorus-nitrogen particulate filler | 41.00 | 41.00 | 41.00 | 41.00 | 41.00 | 41.00 | 41.00 |
| CR-733S | | | | | | | 10.00 |
| Trixylenyl phosphate | | | | | | 10.00 | |
| Triethyl phosphate | | | | | 10.00 | | |
| FP-600 | | | | 10.00 | | | |
| FYROFLEX BDP bisphenol A diphosphate | | | 10.00 | | | | |
| REOFOS RDP resorcinol bis (diphenylphosphate) | | 10.00 | | | | | |
| REOFOS BAPP bisphenol A diphosphate | 10.00 | | | | | | |
| Titanium dioxide | 2.00 | 2.00 | 2.00 | 2.00 | 2.00 | 2.00 | 2.00 |
| Hindered phenolic antioxidant | 0.20 | 0.20 | 0.20 | 0.20 | 0.20 | 0.20 | 0.20 |
| Phosphate-based antioxidant | 0.10 | 0.10 | 0.10 | 0.10 | 0.10 | 0.10 | 0.10 |
| Property | | | | | | | |
| Tensile Strength @ Peak; MPa (psi) | 1218 | 1646 | 1475 | 1769 | 827 | 1323 | 1214 |
| Elongation @ Break; % | 561 | 508 | 549 | 530 | 586 | 512 | 574 |
| 1% Secant Modulus; MPa (psi) | 6025 | 5964 | 6143 | 5564 | 4804 | 5312 | 6863 |
| Lab Extrusion | | | | | | | |
| Torque (amps) | 2.5 | 3.5 | 2.3 | 2.8 | 3.5 | 2.5 | 2.5 |
| Head Pressure (psi) | 2050 | 3030 | 1720 | 2450 | 3350 | 2020 | 1750 |
| VW-1 | | | | | | | |
| Burn Flag (pass/total) | 96.7 | 100.0 | 82.5 | 110.0 | 77.5 | 67.5 | 87.5 |
| Uncharred Length (mm) | 3/3 | 3/3 | 3/3 | 3/3 | 3/3 | 3/3 | 3/3 |

All of Table 2 compositions exhibited good burn performance, tensile elongation to break, and flexibility. While the compositions containing REOFOS RDP™ resorcinol bis (diphenylphosphate) and triethyl phosphate showed modest improvements in extrusion head pressure and torque, most compositions showed substantial improvements.

What is claimed is:

1. A flame retardant polyurethane composition consisting of:
   a. a thermoplastic polyurethane-based resin component that comprises both a thermoplastic polyurethane and a polyolefin, the thermoplastic polyurethane being present in an amount greater than or equal to about 30 weight percent of the total thermoplastic polyurethane-based resin component with the balance of the resin component being the polyolefin;
   b. at least one phosphorus flame retardant particulate filler; and
   c. at least one low melting temperature phosphorus flame retardant agent, wherein the low melting temperature phosphorus flame retardant agent has a melting temperature less than 170 degrees Celsius; and
   d. optionally one or more components selected from the group consisting of antioxidants, thermal stabilizers, hydrolytic stability enhancers, acid scavengers, colorants, UV stabilizers, processing aids, and synergist additives.

2. The flame retardant polyurethane composition according to claim 1 wherein the thermoplastic polyurethane is present in an amount greater than or equal to about 50 weight percent of the total thermoplastic polyurethane-based resin component.

3. The flame retardant polyurethane composition according to claim 1 wherein the thermoplastic polyurethane is present in an amount greater than or equal to about 70 weight percent of the total thermoplastic polyurethane-based resin component.

4. The flame retardant polyurethane composition according to claim 1 wherein the thermoplastic polyurethane is selected from the group consisting of adipate-type thermoplastic polyurethanes, polyester thermoplastic polyurethanes, polyether thermoplastic polyurethanes, and polycarbonate thermoplastic polyurethanes.

5. The flame retardant polyurethane composition according to claim 1 wherein the low melting temperature phosphorus flame retardant agent is present in an amount greater than or equal to about 5 weight percent of the combined weight of the phosphorus flame retardant particulate fillers and the low melting temperature phosphorus flame retardant agent.

6. The flame retardant polyurethane composition according to claim 1 wherein the low melting temperature phosphorus flame retardant agent is present in an amount greater than or equal to about 10 weight percent of the combined weight of the phosphorus flame retardant particulate fillers and the low melting temperature phosphorus flame retardant agent.

7. The flame retardant polyurethane composition according to claim 1 wherein the low melting temperature phosphorus flame retardant agent is present in an amount greater than or equal to about 20 weight percent of the combined weight of the phosphorus flame retardant particulate fillers and the low melting temperature phosphorus flame retardant agent.

8. The flame retardant polyurethane composition according to claim 1 wherein the combined weight of the phosphorus flame retardant particulate fillers and the low melting temperature phosphorus flame retardant agent is greater than or equal to about 25 weight percent of the total weight of the flame retardant polyurethane composition.

9. The flame retardant polyurethane composition according to claim 1 wherein:
   a. the phosphorus flame retardant particulate filler is selected from the group consisting of piperazine polyphosphate, ammonium polyphosphate, and ethylene diamine phosphate; and
   b. the low melting temperature phosphorus flame retardant agent is selected from the group consisting of bisphenol A polyphosphate, resorcinol bis(diphenylphosphate), resorcinol dixylenyl phosphate, trixylenyl phosphate, triethyl phosphate, and triphenyl phosphate and present in an amount greater than or equal to about 5 weight percent of the combined weight of the phosphorus flame retardant particulate fillers and the low melting temperature phosphorus flame retardant agent.

10. The flame retardant polyurethane composition according to claim 1 wherein the low melting temperature phosphorus flame retardant agent is a liquid at room temperature.

11. The flame retardant polyurethane composition according to claim 10 wherein the low melting temperature phosphorus flame retardant agent is selected from the group consisting of bisphenol A polyphosphate, resorcinol bis(diphenylphosphate), resorcinol dixylenyl phosphate, trixylenyl phosphate, triethyl phosphate, and triphenyl phosphate.

12. The flame retardant polyurethane composition according to claim 1 wherein said polyolefin is a copolymer comprising at least one type of polar polymer component.

13. The flame retardant polyurethane composition according to claim 12 wherein said polar polymer component is ethylene vinyl acetate.

14. The flame retardant polyurethane composition according to claim 1 wherein the thermoplastic polyurethane is present in an amount greater than or equal to about 85 weight percent of the total thermoplastic polyurethane-based resin component.

15. The flame retardant polyurethane composition according to claim 14, wherein the thermoplastic polyurethane is present in an amount in the range of from about 85 to about 90 weight percent of the total thermoplastic polyurethane-based resin component.

16. The flame retardant polyurethane composition according to claim 1 wherein the phosphorus flame retardant particulate filler is selected from the group consisting of dimer and oligomeric phosphorus compounds.

17. The flame retardant polyurethane composition according to claim 16 wherein the phosphorus flame retardant particulate filler is selected from the group consisting of piperazine polyphosphate, ammonium polyphosphate, ethylene diamine phosphate, and other phosphorus-nitrogen-based flame retardants.

18. The flame retardant polyurethane composition according to claim 17 wherein the phosphorus flame retardant particulate filler is a phosphorus-nitrogen-based flame retardant, wherein the phosphorus-nitrogen-based flame retardant is a melamine derivative.

\* \* \* \* \*